United States Patent
Steinmark et al.

(10) Patent No.: US 11,392,237 B2
(45) Date of Patent: Jul. 19, 2022

(54) VIRTUAL INPUT DEVICES FOR PRESSURE SENSITIVE SURFACES

(71) Applicant: HEWLETT-PACKARD DEVELOPMENT COMPANY, L.P., Spring, TX (US)

(72) Inventors: Steven Steinmark, Fort Collins, CO (US); Nathan Barr Nuber, Fort Collins, CO (US)

(73) Assignee: Hewlett-Packard Development Company, L.P., Spring, TX (US)

(*) Notice: Subject to any disclaimer, the term of this patent is extended or adjusted under 35 U.S.C. 154(b) by 34 days.

(21) Appl. No.: 16/603,506

(22) PCT Filed: Apr. 18, 2017

(86) PCT No.: PCT/US2017/028158
§ 371 (c)(1),
(2) Date: Oct. 7, 2019

(87) PCT Pub. No.: WO2018/194569
PCT Pub. Date: Oct. 25, 2018

(65) Prior Publication Data
US 2021/0089161 A1 Mar. 25, 2021

(51) Int. Cl.
*G06F 3/041* (2006.01)
*G06T 19/00* (2011.01)

(52) U.S. Cl.
CPC ............ *G06F 3/0416* (2013.01); *G06T 19/00* (2013.01)

(58) Field of Classification Search
None
See application file for complete search history.

(56) References Cited

U.S. PATENT DOCUMENTS

| | | | |
|---|---|---|---|
| 6,492,978 B1* | 12/2002 | Selig | G06F 3/04886 345/173 |
| 7,215,322 B2 | 5/2007 | Genc et al. | |
| 8,217,856 B1 | 7/2012 | Petrou | |
| 2011/0063224 A1 | 3/2011 | Vexo et al. | |
| 2014/0160055 A1 | 6/2014 | Margolis et al. | |
| 2014/0368455 A1 | 12/2014 | Croisonnier et al. | |
| 2015/0133193 A1 | 5/2015 | Stotler | |
| 2016/0086379 A1 | 3/2016 | Sadi et al. | |
| 2017/0123492 A1* | 5/2017 | Marggraff | H04N 5/247 |
| 2017/0352187 A1* | 12/2017 | Haines | G06F 16/48 |
| 2019/0174088 A1* | 6/2019 | Kim | G02B 27/017 |
| 2019/0310703 A1* | 10/2019 | Kurihara | G06F 3/048 |

FOREIGN PATENT DOCUMENTS

EP 2733576 A1 5/2014

OTHER PUBLICATIONS

Hugh Langley, VR News (https://www.wareable.com/vr) These are the HTC Vive's new controllers and they're one-upping Oculus, Oct. 13, 2016 (6 pages).
Joshi, B.P. et al., Augmented Reality 6th Sense, 2014, <http://research.ijcaonline.org/iconect/number1/iconect1425.pdf>.
Sensel—Kickstarter, The Sensel Morph: Interaction, Evolved dated on or before Mar. 2017 (31 pages).

\* cited by examiner

*Primary Examiner* — Duane N Taylor, Jr.
(74) *Attorney, Agent, or Firm* — Trop Pruner & Hu PC

(57) ABSTRACT

In some examples, a processor of a system is to cause display of a virtual input device on a display device, the virtual input device corresponding to a pressure sensitive surface, and perform different tasks responsive to different touch pressures applied on a first location of the pressure sensitive surface.

5 Claims, 7 Drawing Sheets

VIRTUAL INPUT DEVICES FOR PRESSURE SENSITIVE SURFACES

BACKGROUND

A simulated reality system can be used to present simulated reality content on a display device. In some examples, simulated reality content includes virtual reality content that includes virtual objects that a user can interact with using an input device. In further examples, simulated reality content includes augmented reality content, which includes images of real objects (as captured by an image capture device such as a camera) and supplemental content that is associated with the images of the real objects. In additional examples, simulated reality content includes mixed reality content (also referred to as hybrid reality content), which includes images that merge real objects and virtual objects that can interact.

BRIEF DESCRIPTION OF THE DRAWINGS

Some implementations of the present disclosure are described with respect to the following figures.

Figure 1:
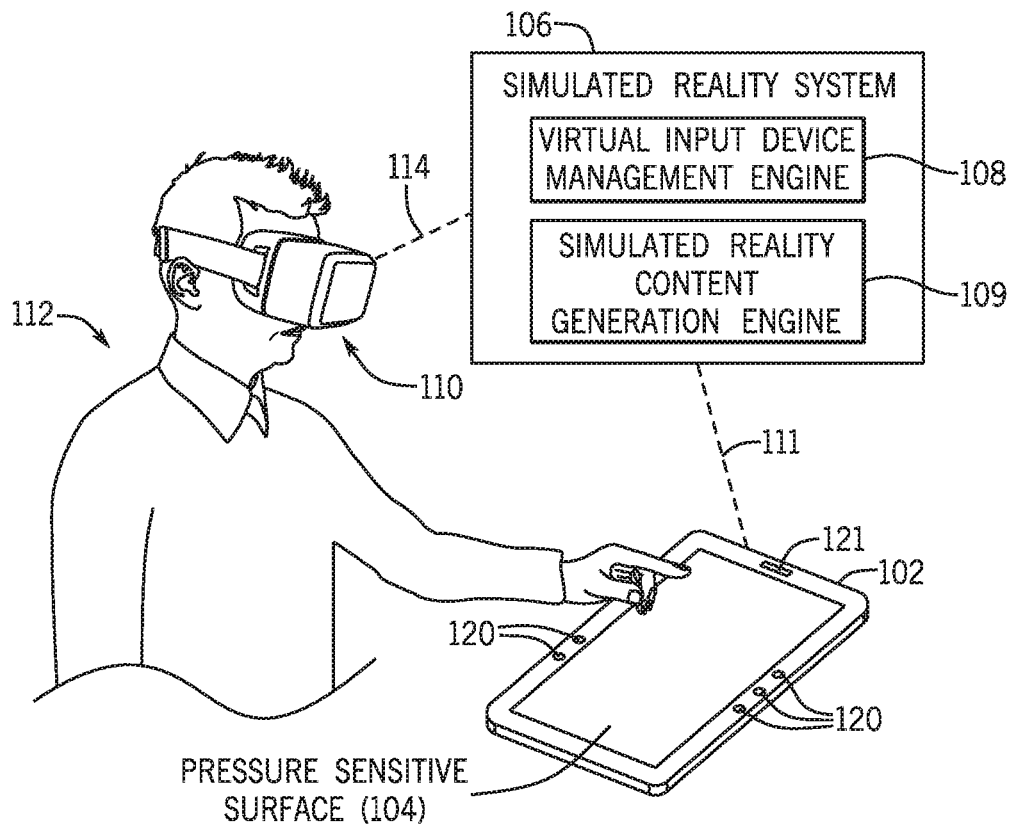
FIG. 1 illustrates an arrangement that includes a simulated reality system and a pressure sensitive surface, according to some examples.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

In the present disclosure, use of the term "a," "an", or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

Simulated reality content can be displayed on display devices of any of multiple different types of electronic devices. In some examples, simulated reality content can be displayed on a display device of a head-mounted device. A head-mounted device refers to any electronic device (that includes a display device) that can be worn on a head of a user, and which covers an eye or the eyes of the user. In some examples, a head-mounted device can include a strap that goes around the user's head so that the display device can be provided in front of the user's eye. In further examples, a head-mounted device can be in the form of electronic eyeglasses that can be worn in the similar fashion as normal eyeglasses, except that the electronic eyeglasses include a display screen (or multiple display screens) in front of the user's eye(s).

When viewing simulated reality content displayed by a head-mounted device or another type of electronic device, a user may not be able to see a real physical input device, which may be held in the users hand(s) or may be laying on a surface (e.g., desk surface, tabletop, or any other surface). For example, the head-mounted device may obstruct the user's view of the real world. As another example, when looking at the display device of an electronic device, the user's head may be turned away from the physical input device.

As a result, the user may not be able to determine where the user's fingers are relative to control elements of the physical input device. For example, if the physical input device is a keyboard, the user would not be able to determine which keys the user's fingers are over when the user is viewing simulated reality content on the head-mounted device. As another example, if the physical input device is a trackpad that has a trackpad surface and control buttons, the user would not be able to determine where the user's fingers are relative to the trackpad surface and the control buttons. As a further example, if the physical input device is a touch sensitive display screen, the user looking at simulated reality content while wearing a head-mounted device or looking at the display device of another type of electronic device may not be able to see control icons or other control elements displayed by the touch sensitive display screen.

In accordance with some implementations of the present disclosure, a virtual input device corresponding to a real input device can be displayed along with simulated reality content presented by a simulated reality system. The virtual input device can be part of the simulated reality content, or the virtual input device can be separately generated but can be overlaid over the simulated reality content.

As used here, a "real input device" refers to a physical input device that exists in the real world and that is actually used by a user to enter inputs to the simulated reality system. Inputs can be entered by user touch of a portion of the physical input device with the user's finger (or fingers), or using a different input object, such as a stylus, a digital pen, and so forth.

FIG. 1 shows an example arrangement that includes a real input device 102. The real input device 102 includes a pressure sensitive surface 104. In some examples, the real input device 102 can include a handheld computer (e.g., a tablet computer, a smartphone, etc.) that has a touch sensitive (and pressure sensitive) display surface, which is responsive to different pressures applied on the touch sensitive display surface. In other examples, the real input device 102 can include a touchpad on which is provided the pressure sensitive surface 104; this touchpad does not include a display surface, but rather includes sensing circuitry to detect touch input at different locations of the touchpad, where the sensing circuitry can additionally detect different pressures applied on the pressure sensitive surface 104.

The pressure sensitive surface 104 is responsive to touch input on the pressure sensitive surface 104 using an input object (such as a user's finger, a stylus, a digital pen, etc.). In addition, the pressure sensitive surface 104 is responsive to different touch pressures applied on a particular location of the pressure sensitive surface. The different touch pressures are caused by different forces applied on the pressure sensitive surface at the particular location by the input object. As explained further below, different touch pressures applied on the particular location of the pressure sensitive surface 104 can cause different actions to be performed.

FIG. 1 also depicts a simulated reality system 106, which includes a virtual input device management engine 108. As used here, an "engine" can refer to a hardware processing circuit, or a combination of a hardware processing circuit and machine-readable instructions (software and/or firmware) executable on the hardware processing circuit. Examples of a hardware processing circuit include any or some combination of a microprocessor, a core of a multi-core microprocessor, a microcontroller, a programmable gate array, a programmable integrated circuit device, and so forth.

FIG. 1 further depicts a head-mounted device 110, which can be worn on a head of a user 112. The head-mounted device 110 includes a display device, such as a display device 202 shown in FIG. 2.

Although reference is made to use of a head-mounted device in some examples, it is noted that solutions according to some implementations of the present disclosure can be applied to other types of electronic devices, such as a handheld electronic device, a notebook computer, a desktop computer, and so forth.

The simulated reality system 106 can be implemented using a computer, such as a smartphone, a tablet computer, a desktop computer, a notebook computer, and so forth. In examples where the simulated reality system 106 is sufficiently small, such as a smartphone or a game appliance, the simulated reality system 106 can be part of or can be mounted to the head-mounted device 110.

In further examples, the simulated reality system 106 is separate from the head-mounted device 110, but is able to communicate with the head-mounted device 110 over a communication link 114, where the communication link 114 can include a wired link (in the form of a cable, for example) or a wireless link. A wireless link can include a Bluetooth link, a Wi-Fi network connection, a cellular network connection, and so forth.

Although the simulated reality system 106 and the real input device 102 are shown as separate components, it is noted that in other examples, the pressure sensitive surface 104 can be part of the simulated reality system 106.

Figure 2:
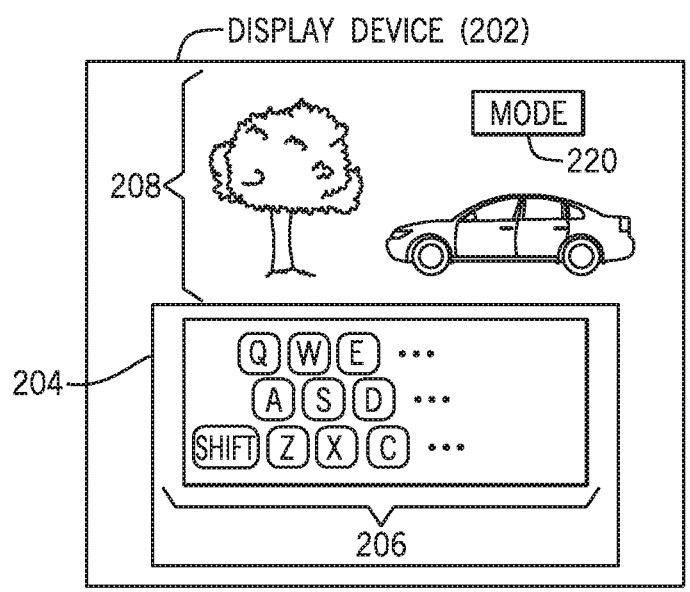
FIG. 2 illustrates a display device display an image including a simulated reality content and a virtual input device, according to some examples.

The virtual input device management engine 108 can cause display of a virtual input device 204 on the display device 202 of FIG. 2 (which can be part of the head-mounted device 110). The virtual input device 204 corresponds to the pressure sensitive surface 104. A "virtual input device" refers to a simulated input device that can be displayed to a user, but the virtual input device is not a real input device. Rather, the virtual input device is a representation of a real input device, which in the example of FIG. 1 is the real input device 102. In the example of FIG. 2, the virtual input device 204 includes an arrangement of keys 206 (including alphanumeric keys) that are part of a keyboard.

Note that although an arrangement of keys 206 of a keyboard is depicted as part of the virtual input device 204 of FIG. 2, it is noted that the pressure sensitive surface 104 may not actually present a keyboard. In fact, the pressure sensitive surface 104 may be a blank surface that is able to receive touch inputs at different locations corresponding to keys of a keyboard, when in fact a keyboard is actually not presented by the pressure sensitive surface 104.

As discussed further below, in other examples, a keyboard overlay can be provided over the pressure sensitive surface 104, where the keyboard overlay can include structures that correspond to keys of a keyboard to give the user 112 tactile feedback regarding where the user's fingers are on the real input device 102.

In other examples, the virtual input device 204 can be a different type of input device, such as a trackpad with control buttons, a touch sensitive display surface, and so forth. In each case, the real input device 102 may not actually depict such other types of input devices—rather, the pressure sensitive surface 104 of the real input device 102 may be a blank surface that is capable of detecting touch input at different locations.

The simulated reality system 106 further includes a simulated reality content generation engine 109 to generate simulated reality content 208 for display on the display device 202. As used here, "simulated reality content" can refer to any of the following: virtual reality content, augmented reality content, or mixed reality content. Virtual reality content refers to content that is completely simulated, with no depiction of any real object. Augmented reality content refers to a depiction of a real object (such as captured by a camera) along with supplemental content, which can include text, graphical images, or other information. Mixed reality content refers to content that merges captured images of real objects and virtual objects that can interact.

The simulated reality system 106 can cause the simulated reality content 208 to be displayed in conjunction with the virtual input device 204. The displayed virtual input device 204 can be part of the simulated reality content 208, or the displayed virtual input device 204 can be separately generated but can be overlaid over the simulated reality content 208.

In further examples, the simulated reality system 106 is able to track a position of the pressure sensitive surface 104. In some examples, the real input device 102 includes markings 120 that can be detected by the simulated reality system 106, such as by a camera or other sensor of the simulated reality system 106. As the real input device 102 is moved around, the camera or other sensor of the simulated reality system 106 is able to detect this movement based on tracking the markings 120. The markings 120 can include visible elements, invisible elements (e.g., infrared elements), optical sources, and so forth, that are detectable by a camera or another sensor.

In response to the tracking of the pressure sensitive surface 104 (and more specifically tracking the markings 120 provided on the real input device 102), the simulated reality system 106 is able to adjust a position of the virtual input device 204 as displayed by the display device 202.

Figure 3:
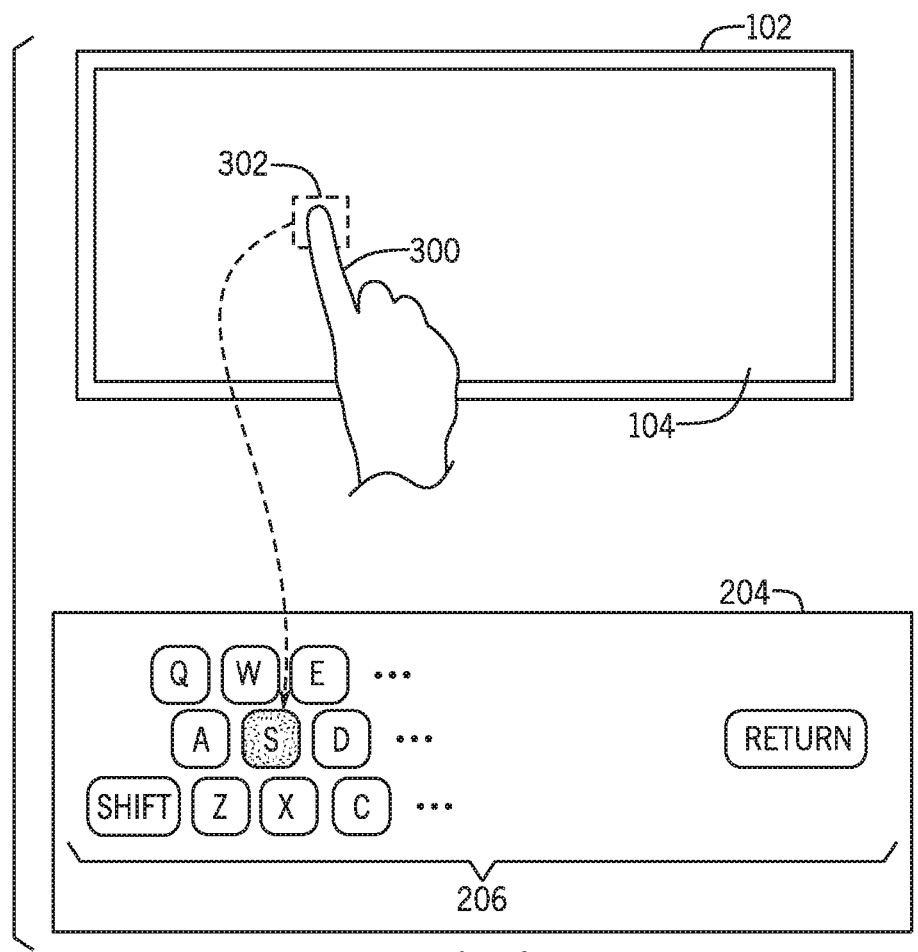
FIG. 3 illustrates correspondence between a touch input on a pressure sensitive surface and a control element of a virtual input device, according to some examples.

FIG. 3 shows an example of a user's finger 300 touching a location 302 on the pressure sensitive surface 104 of the real input device 102. The location 302 touched by the user's finger 300 can correspond to the "S" key on the virtual input device (referred to as a "virtual keyboard 204" in the ensuing discussion) displayed by the display device 202.

The real input device 102 is able to detect a location of a touch input on the pressure sensitive surface 104, and an amount of pressure applied on the pressure sensitive surface 104 at the location. The real input device 102 is able to transmit over a communication link 111 information to the simulated reality system 106, where the transmitted information can indicate the location of a touch input and an amount of pressure applied at the location.

The virtual input device management engine 108 can receive indications of different touch pressures from the real input device 102 that includes the pressure sensitive surface 104.

In response to the user's finger 300 applying a first touch pressure on the location 302 on the pressure sensitive surface 104, the virtual input device management engine 108 causes the "S" key of the virtual keyboard 204 to be highlighted, such as by changing a color of the "S" key relative to the color of the other keys, or by darkening or lightening the "S" key relative to the other keys. Alternatively, touching the location 302 on the pressure sensitive surface 104 with the first touch pressure causes the "S" key to be enlarged from a normal size to an enlarged size, while the remaining keys of the virtual keyboard 204 remain at the normal size. The normal size of a key refers to a size of a key that is displayed when no touch input is made on the pressure sensitive surface 104.

As used here, a "first touch pressure" can refer to a pressure that is within a first predefined pressure range. Any touch pressure that is within the first predefined pressure range is considered to be a "first touch pressure." A touch pressure refers to an amount of force imparted on a surface by an input object. Similarly, a "second touch pressure" can refer to a pressure that is within a second predefined pressure range. Any touch pressure that is within the second predefined pressure range is considered to be a "second touch pressure."

The touching of the location 302 with the first touch pressure does not cause the virtual input device management engine 108 to activate the "S" key of the virtual keyboard 204. Rather, the highlighting of the "S" key of the virtual keyboard 204 provides feedback (in the form of the highlighting of the "S" key of the virtual keyboard 204 displayed on the display device 202 of FIG. 2) to the user that the user's finger has touched a location on the pressure sensitive surface 104 that corresponds to the "S" key. If both of the user's hands are touching the pressure sensitive surface 104, with the different fingers of the user's hands touching different locations on the pressure sensitive surface 104 (both at the first touch pressure), then multiple keys of the virtual keyboard 204 corresponding to the touched locations can be highlighted to indicate to the user which keys are being touched by the user.

In other examples, instead of highlighting the "S" key in response to the first touch pressure applied by the user's finger 300 on the location 302 of the pressure sensitive surface 104, the first touch pressure applied on the location 302 can cause the virtual input device management engine 108 to display an input object over the "S" key in the image displayed by the display device 202. The input object can be a representation of the user's finger or some other input object, such as a stylus or digital pen.

More generally, in response to the first touch pressure applied on a given location of the pressure sensitive surface 104, a feedback indication relative to a control element of the virtual input device is provided to the user on the display device 202, where the feedback indication can include highlighting a control element of the virtual input device 204, or the feedback indication can include a representation of an input object provided over the control element.

If the user desires to activate a specific key, such as the "S" key, then the user can apply a greater second touch pressure (greater than the first touch pressure) onto a corresponding location of the pressure sensitive surface 104. For example, the user's finger 300 can apply the second touch pressure on the location 302 on the pressure sensitive surface 104, to cause the "S" key to be activated. The applied second touch pressure on the location 302 of the pressure sensitive surface 104 can be communicated to the virtual input device management engine 108, which interprets the detected second touch pressure as an indication that the "S" key is to be activated. This can cause a respective task to be performed. For example, if the user is entering text, then the letter "S" would be entered into a respective region displayed on the display device 202. In other examples, the "S" key can correspond to a different action, such as an action of an electronic game that is being played by the user.

With respect to the location 302 of the pressure sensitive surface 104, different tasks are performed by the simulated reality system 106 in response to different touch pressures applied on the location 302 of the pressure sensitive surface 104. A first task of the different tasks includes highlighting the "S" key of the virtual keyboard 204, while a second task of the different tasks corresponding to a second touch pressure causes activation of the "S" key.

More generally, a first touch pressure on a given location of the pressure sensitive surface 104 causes feedback to be provided to the user regarding the touching of a control element of a virtual input device displayed by the display device 202, while a second touch pressure applied on the given location of the pressure sensitive surface 104 causes activation of the control element of the virtual input device 204.

In further examples, the user 112 is able to toggle between different types of input devices for use with the simulated reality system 106. The toggling to different modes can be performed in response to activation of a physical control element 121 on the real input device 102, where the control element 121 can include a control button, a control switch, or any other type of control element. In other examples, the mode toggling control element can be a virtual mode toggling control element 220 displayed on the display device 202. The user can activate the virtual mode toggling control element 220, such as by touching a respective location on the pressure sensitive surface 104, or touching some other input control element.

When the user activates the mode toggling control element (121 or 220), the virtual input device management engine 108 receives an indication of actuation of a mode toggle control element. In response to the actuation of the mode toggle control element, the virtual input device management engine 108 causes a switch from the display of a first virtual input device (e.g., a virtual keyboard) to a display of a different second virtual input device (e.g., a trackpad, a touchscreen, an arrangement of function buttons, etc.). Once the switch has occurred and the second virtual input device is displayed, the virtual input device management engine 108 can receive an indication of touch input (at respective touch pressures) related to the second virtual input device on the pressure sensitive surface 104.

Figure 4:
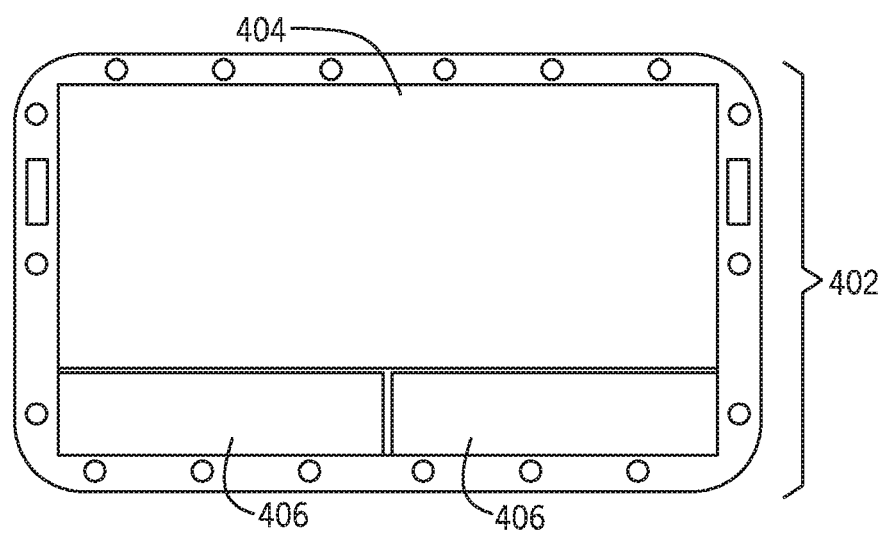
FIGS. 4-7 illustrate different examples of virtual input devices that are displayable according to some examples.

FIG. 4 shows an example of a virtual trackpad 402 that can be displayed on the display device 202, to represent the real input device 102. The virtual trackpad 402 has a touch sensitive surface 404 and control buttons 406.

Figure 5:
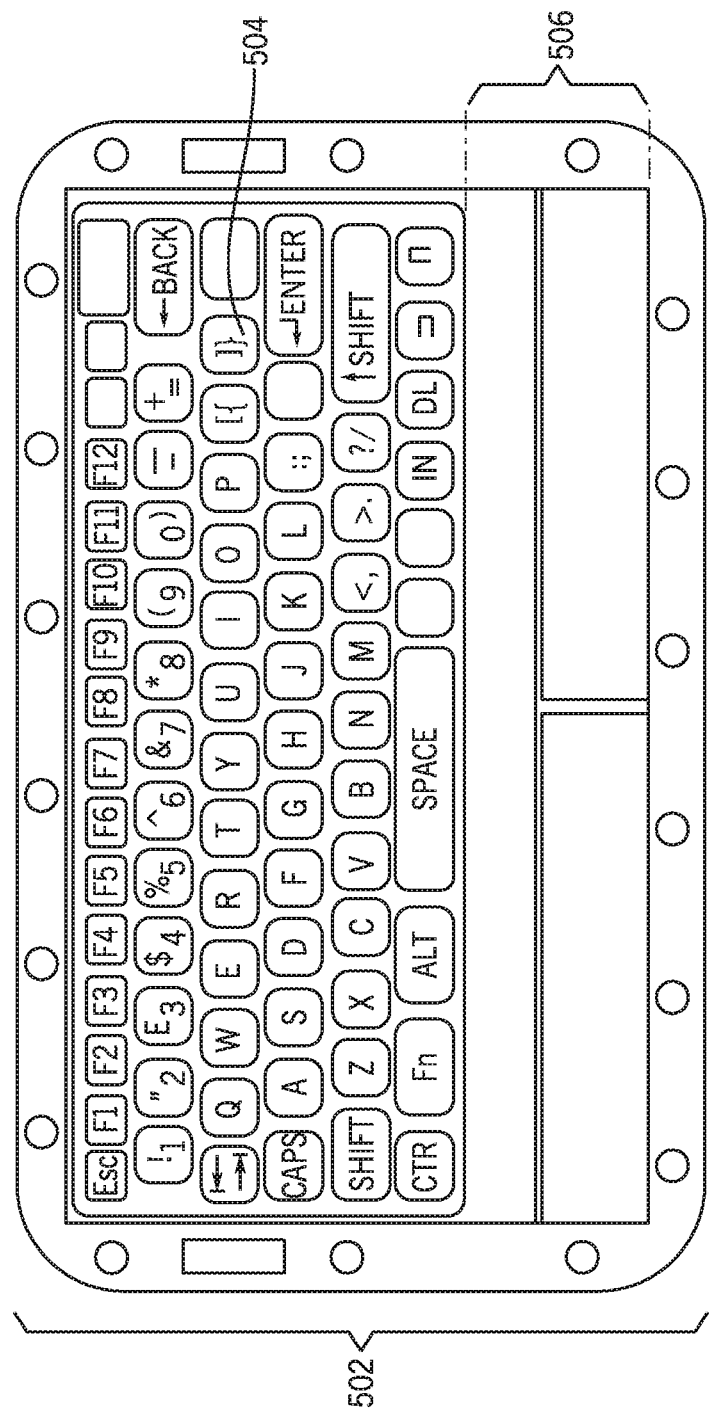

FIG. 5 shows an example of a virtual keyboard-trackpad combination 502 that can be displayed on the display device 202, to represent the real input device 102. The virtual keyboard-trackpad combination 502 includes a virtual keyboard 504 and a virtual trackpad 506.

Figure 6:
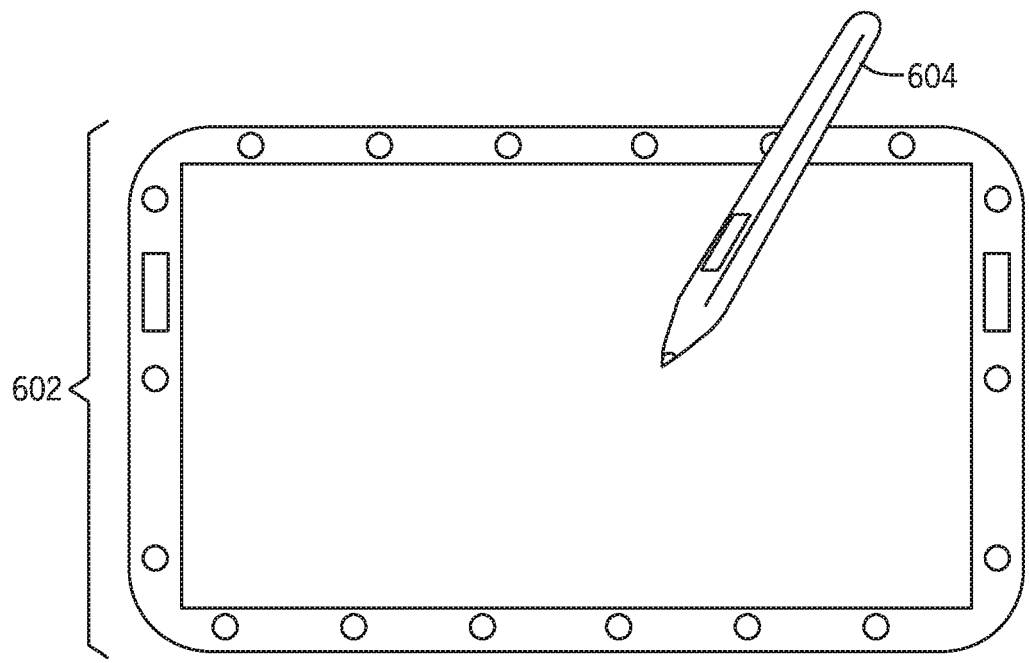

FIG. 6 shows a virtual touchscreen 602 that can be displayed on the display device 202, to represent the real input device 102. FIG. 6 further shows a virtual stylus 604 that can be used to make inputs on the virtual touchscreen 602. The user can hold an actual physical stylus, and the virtual stylus 604 represents the physical stylus. The virtual stylus 604 is displayed on the display device 202 over the virtual touchscreen 602. A camera or other sensor can be used to capture the position and orientation of the physical stylus, and the displayed virtual stylus 604 can have an orientation and position that corresponds to the captured position and orientation of the physical stylus. In other examples, the physical stylus can include position and orientation sensors to measure a position and orientation of the physical stylus, and the measured position and orientation can be communicated to the simulated reality system 106 to cause display of the virtual stylus 604 at the corresponding position and orientation.

Figure 7:
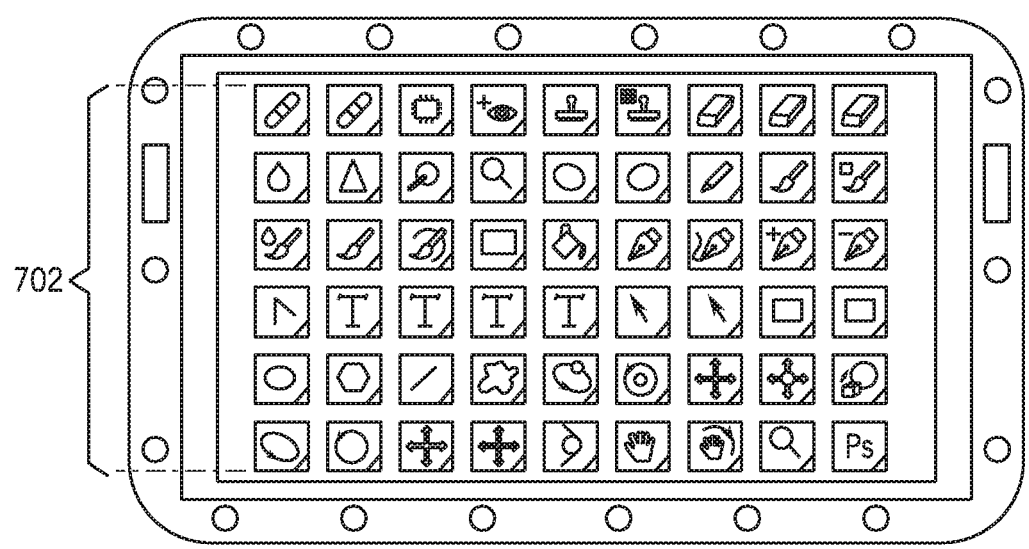

FIG. 7 illustrates an arrangement 702 of virtual function keys that can be displayed on the display device 202, to represent the real input device 102. A "function key" can refer to any key that is associated with a corresponding action. For example, a function key can include a macro key, where a "macro" can refer to a respective procedure that can be executed in response to activation of the macro key.

Figure 8:
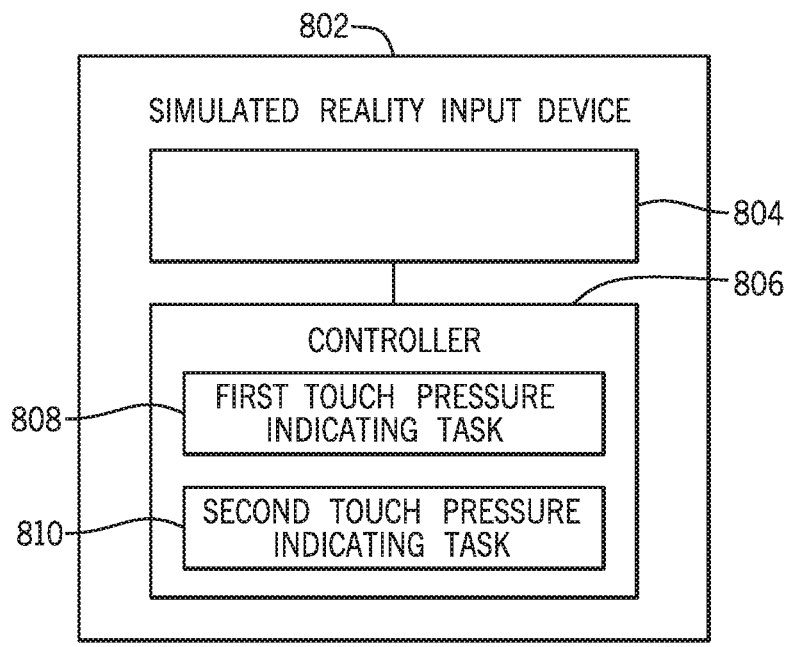
FIGS. 8-10 are block diagrams of a simulated reality input device, according to various examples.

FIG. 8 is a block diagram of a simulated reality input device 800 according to examples. The simulated reality input device 800 of FIG. 8 is an example of the real input device 102 shown in FIG. 1.

The simulated reality input device 800 includes a pressure sensitive surface 804 and a controller 806. The controller 806 can include a hardware processing circuit or a combination of a hardware processing circuit and machine-readable instructions executable on the hardware processing circuit. Examples of a hardware processing circuit can include any or some combination of a microprocessor, a core of a multi-core microprocessor, a microcontroller, a programmable gate array, a programmable integrated circuit device, and so forth.

The controller 806 can perform various tasks, which include a first touch pressure indicating task 808 that sends a first indication to a simulated reality system (e.g., 106 in FIG. 1) that displays simulated reality content and a virtual input device representing the input device 800, in response to a first touch pressure applied at a given location on the pressure sensitive surface 804.

The controller 806 can further perform a second touch pressure indicating task 810, which sends a second indication to the simulated reality system in response to a different second touch pressure applied at the given location on the pressure sensitive surface 804.

Figure 9:
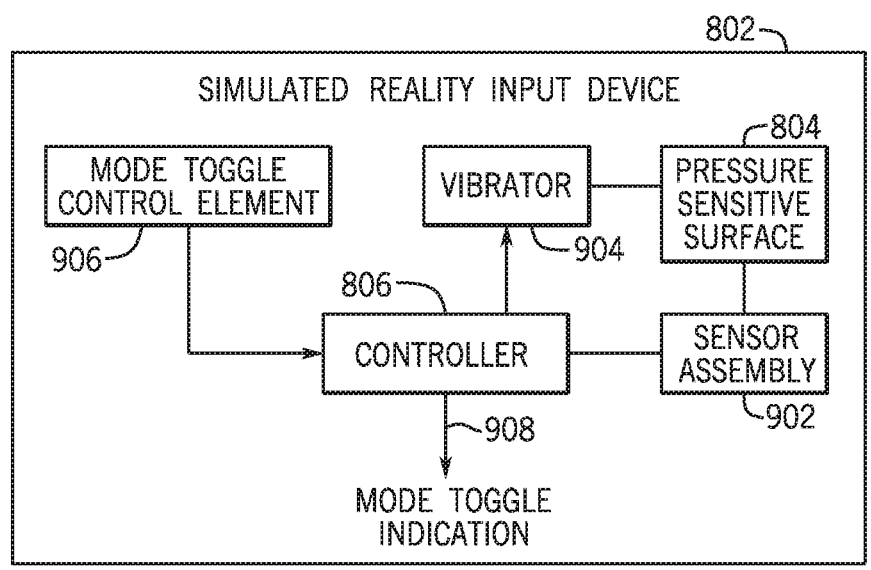

FIG. 9 is a block diagram of the simulated reality input device 802 according to further examples. The simulated reality input device 802 includes the pressure sensitive surface 804 and the controller 806 depicted in FIG. 8. In addition, the simulated reality input device 802 includes a sensor assembly 902, which can include a sensor (or multiple sensors) to detect touch input on the pressure sensitive surface 804. The sensor assembly 902 can also detect an amount of touch pressure applied at each specific location on the pressure sensitive surface 804. The touch pressure applied on a given location on the pressure sensitive surface 804 can include no pressure (which corresponds to a condition where an input object, e.g., a user's finger or a stylus, is not touching the given location of the pressure sensitive surface 804), a first touch pressure (which corresponds to the input object lightly touching at the given location on the pressure sensitive surface 804), and a second touch pressure (which corresponds to the input object pressing down harder on the given location on the pressure sensitive surface 804).

The simulated reality input device 802 further includes a vibrator 904, which can cause vibration of a portion of the pressure sensitive surface 804, in response to any of the following: a user touching the pressure sensitive surface 804 with a first touch pressure, a user touching the pressure sensitive surface 804 with a second touch pressure, a control element being activated, or in response to the user touch on the pressure sensitive surface 804 moving between different locations of the pressure sensitive surface 804.

The simulated reality input device 802 also includes a mode toggle control element 906, which can be actuated by a user. In response to actuation of the mode toggle control element 906, the controller 806 can send a mode toggle indication 908 to cause the simulated reality system to switch from displaying a first virtual input device to displaying a different second virtual input device.

Figure 10:
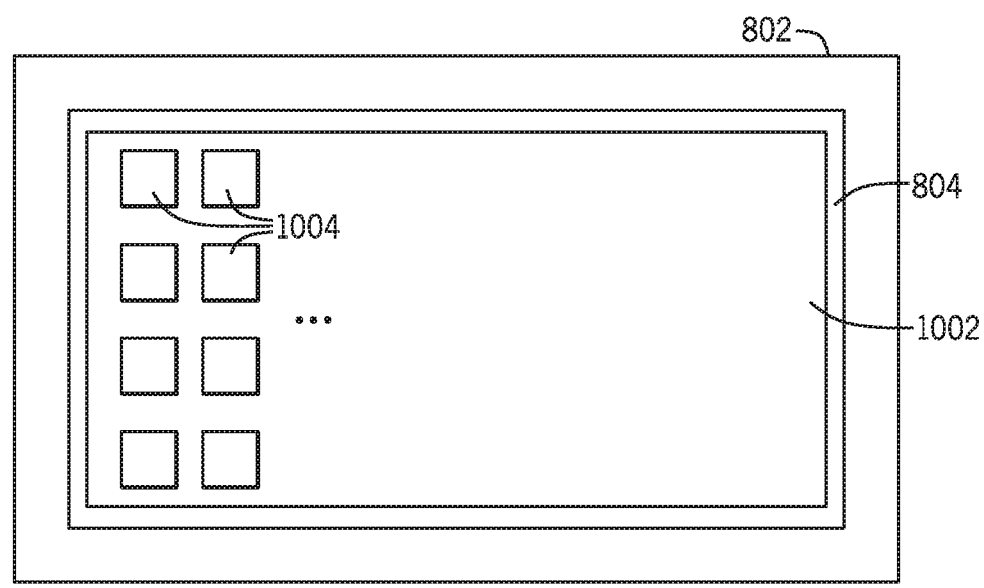

FIG. 10 shows another example relating to the simulated reality input device 802, which has the pressure sensitive surface 804. In the example of FIG. 10, a physical overlay 1002 is physically arranged over the pressure sensitive surface 804. The physical overlay 1002 can include physical structures (or physical overlay portions) corresponding to a specific type of input device. The physical overlay 1002 provides haptic feedback to the user as the user is using the input device 802.

In the example of FIG. 10, the physical overlay 1002 is a physical keyboard overlay, which has "key" structures 1004 corresponding to keys of a keyboard. The key structures 1004 can include protrusions or indentations that the user can feel as the users fingers touch the key structures 1004. In some examples, the key structures 1004 can be depressed by the user to simulate the depressing of keys of a keyboard during typing. When a user presses down on a key structure 1004, a corresponding touch pressure is applied on the pressure sensitive surface 804.

In other examples, the physical overlay 1002 can be a different type of physical overlay, such as a physical overlay for a touchpad.

Figure 11:
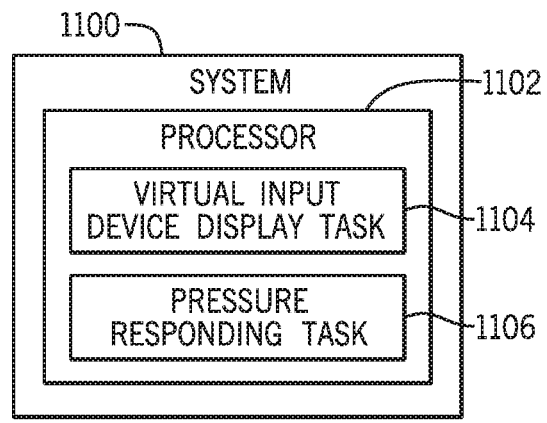
FIG. 11 is a block diagram of a system according to some examples.

FIG. 11 is a simplified view of a system 1100, which includes a processor 1102 to perform respective tasks, including a virtual input device display task 1104 to cause display of a virtual input device on a display device, where the virtual input device corresponds to a pressure sensitive surface. The processor 1102 further performs a pressure responding task 1106 to perform different tasks in response to different touch pressures applied on a given location of the pressure sensitive surface.

A processor performing a task can refer to a single processor performing the task, or to multiple processors performing the task. A processor can include a microprocessor, a core of a multi-core microprocessor, a microcontroller, a programmable integrated circuit, a programmable gate array, or another hardware processing circuit.

Figure 12:
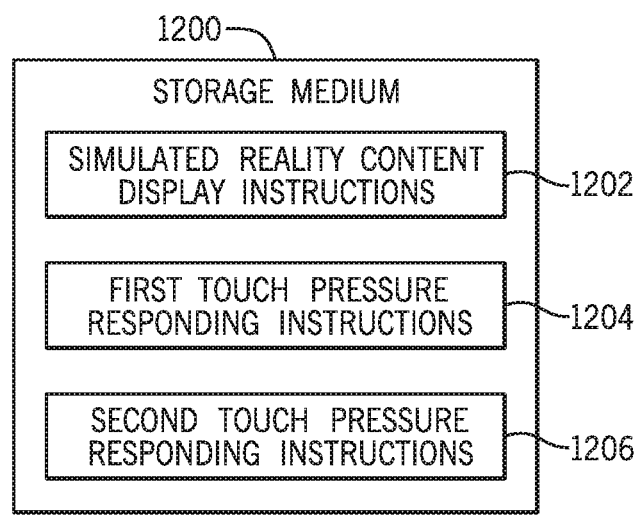
FIG. 12 is a block diagram of a storage medium storing machine-readable instructions according to some examples.

FIG. 12 is a block diagram of a non-transitory machine-readable or computer-readable storage medium 1200, which stores machine-readable instructions that upon execution cause a system to perform various actions. The machine-readable instructions include simulated reality content display instructions 1202, to cause display of simulated reality content and a virtual input device, the virtual input device corresponding to a pressure sensitive surface. The machine-readable instructions further include first touch pressure responding instructions 1204 to cause display of a feedback indication relative to a control element of the virtual input device, in response to a first indication of a first touch pressure applied on a given location of the pressure sensitive surface. The feedback indication can include highlighting a control element of the virtual input device, or displaying an input object over the control element.

The machine readable instructions further include second touch pressure responding instructions 1206 to activate the control element of a virtual input device in response to a second indication of a different second touch pressure applied on the given location of the pressure sensitive surface.

The storage medium 1200 can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A simulated reality input device comprising:
a pressure sensitive surface;
a physical overlay on the pressure sensitive surface, the physical overlay comprising a plurality of physical structures that correspond to respective displayed control elements of a virtual input device displayed on a display device and that comprises a displayed representation of a real input device, wherein user touch inputs on respective physical structures of the plurality of physical structures correspond to touches of the respective displayed control elements; and
a processor to:
in response to a first touch pressure applied through the physical overlay at a first location on the pressure sensitive surface, send a first indication to a simulated reality system that displays simulated reality content and the virtual input device, wherein the simulated reality content is at least one selected from among a virtual reality content, an augmented reality content, or a mixed reality content; and
in response to a different second touch pressure applied through the physical overlay at the first location on the pressure sensitive surface, send a second indication to the simulated reality system.

2. The simulated reality input device of claim 1, further comprising:
a vibrator to cause vibration of a portion of the pressure sensitive surface in response to at least one selected from among: a user touch on the pressure sensitive surface with the first touch pressure, a user touch on the pressure sensitive surface with the second touch pressure, activation of a displayed control element of the virtual input device, or a user touch on the pressure sensitive surface moving between different locations of the pressure sensitive surface.

3. The simulated reality input device of claim 1, wherein the virtual input device comprises a virtual keyboard.

4. The simulated reality input device of claim 1, further comprising a sensor assembly comprising sensors to detect the first and second touch pressures.

5. The simulated reality input device of claim 1, wherein the physical overlay comprises a physical keyboard overlay, and the plurality of physical structures comprise key structures.

* * * * *